(12) United States Patent
Brandão

(10) Patent No.: US 10,583,644 B2
(45) Date of Patent: Mar. 10, 2020

(54) PROCESS FOR MANUFACTURING CORK TILE

(71) Applicant: Corkart SA, Vendas Novas (PT)

(72) Inventor: José Manuel Martins Brandão, Montijo (PT)

(73) Assignee: CORKART SA, Vendas Novas (PT)

( * ) Notice: Subject to any disclaimer, the term of this patent is extended or adjusted under 35 U.S.C. 154(b) by 137 days.

(21) Appl. No.: 15/678,383

(22) Filed: Aug. 16, 2017

(65) Prior Publication Data

US 2019/0054727 A1 Feb. 21, 2019

(51) Int. Cl.

| | |
|---|---|
| *B32B 38/06* | (2006.01) |
| *E04F 15/10* | (2006.01) |
| *E04F 13/16* | (2006.01) |
| *B44C 5/04* | (2006.01) |
| *E04F 15/00* | (2006.01) |
| *B32B 21/00* | (2006.01) |
| *B44C 1/17* | (2006.01) |
| *E04F 13/10* | (2006.01) |
| *E04F 15/04* | (2006.01) |
| *B32B 37/06* | (2006.01) |
| *B32B 37/12* | (2006.01) |
| *B32B 38/00* | (2006.01) |

(52) U.S. Cl.
CPC .............. *B32B 38/06* (2013.01); *B32B 21/00* (2013.01); *B44C 1/1712* (2013.01); *B44C 5/04* (2013.01); *E04F 13/10* (2013.01); *E04F 13/16* (2013.01); *E04F 15/00* (2013.01); *E04F 15/045* (2013.01); *E04F 15/102* (2013.01); *B32B 37/06* (2013.01); *B32B 37/12* (2013.01); *B32B 38/145* (2013.01); *B32B 2307/748* (2013.01); *B32B 2309/105* (2013.01); *B32B 2317/02* (2013.01); *B32B 2419/04* (2013.01)

(58) Field of Classification Search
None
See application file for complete search history.

(56) References Cited

U.S. PATENT DOCUMENTS 2,159,693 A * 5/1939 Gaylord, Jr. .......... B44C 1/1712
106/144.71
4,919,994 A * 4/1990 Incremona ............ B44C 1/1733
156/234

(Continued)

FOREIGN PATENT DOCUMENTS

CN 101879619 A 11/2010
DE 102012112562 A1 6/2014

(Continued)

OTHER PUBLICATIONS

Machine translation of JP2016-215568A (Year: 2016).*

*Primary Examiner* — Barbara J Musser
(74) *Attorney, Agent, or Firm* — Lucas & Mercanti, LLP

(57) ABSTRACT

A process for applying a color pattern or design to a cork tile includes providing a release film, printing a design layer on the release film, applying a glue layer on the design layer so that the design layer is between the glue layer and the release film, and laminating the design layer and glue layer onto a cork top surface of the cork tile using a heated laminating machine, so that the glue layer and the design layer are released from the release film and form the color pattern or design on the cork top surface.

21 Claims, 4 Drawing Sheets

(56) References Cited

U.S. PATENT DOCUMENTS

| | | | |
|---|---|---|---|
| 5,543,193 A | | 8/1996 | Tesch |
| 5,662,977 A | * | 9/1997 | Spain .................. B29C 37/0025 428/141 |
| 5,718,789 A | | 2/1998 | Gebhardt et al. |
| 6,212,838 B1 | * | 4/2001 | Eda .......................... B32B 9/02 52/403.1 |
| 7,238,416 B2 | | 7/2007 | Mauk et al. |
| 8,196,366 B2 | | 6/2012 | Thiers et al. |
| 8,758,881 B2 | | 6/2014 | Rehker et al. |
| 2003/0033777 A1 | * | 2/2003 | Thiers ....................... B32B 7/02 52/390 |
| 2014/0335321 A1 | | 11/2014 | Reisman et al. |
| 2015/0275528 A1 | | 10/2015 | Muehlebach |
| 2016/0016390 A1 | | 1/2016 | Lundblad et al. |

FOREIGN PATENT DOCUMENTS

| | | | | |
|---|---|---|---|---|
| EP | 2082897 B1 | | 7/2009 | |
| GB | 937266 A | | 9/1963 | |
| GB | 1388155 A | * | 3/1975 | ............... B44C 1/17 |
| JP | 2016215568 A | * | 12/2016 | |
| WO | 2011149370 A1 | | 12/2011 | |
| WO | 2013034616 A1 | | 3/2013 | |

* cited by examiner

PROCESS FOR MANUFACTURING CORK TILE

BACKGROUND OF THE INVENTION

The present invention relates to a printing process for printing a design onto cork tiles for flooring, wall coverings, and ceilings.

Cork is a natural material that is harvested from the bark of cork oak trees, which are endemic to Southwest Europe and Northwest Africa. Cork is extracted by removing the bark from the trees. Cork is a renewable material in that the cork oak tree regenerates naturally after each extraction of its bark. During a typical lifespan of 150 to 200 years, a cork oak tree can be extracted 15-18 times.

Cork is elastic, highly impermeable, and fire retardant. The characteristics of cork are due to its cellular structure. Cork is composed of small cells of suberin, which are filled with a gas mixture similar to air. The unique structure and materials of cork provide cork with many useful properties. For example, it's high-permeability and elasticity make cork suitable for the most common use as a bottle stopper. The same characteristics also make cork suitable for use as a gasket material, fishing floats and buoys, as well as handles for fishing poles. Cork's cellular form and fire retardant properties also make it suitable for use as acoustic and thermal insulation in-house walls, floors, ceilings, and façades.

Cork is also increasingly used as a flooring and wall covering material. The following properties of cork make it highly suitable for use as a flooring material:

Durable—the elastic properties of cork allow it to bounce back so that furniture indentations are not permanent;

Healthy—cork is anti-microbial, naturally resistant to mold, mildew, and termites, and it does not off-gas or shared microfibers;

Safe—cork is fire resistant and produces less smoke and less toxic material than vinyl flooring during combustion;

Comfortable—a cork floor provides a comfortable cushion underfoot because it gives one compressed, and is also a natural thermal and acoustic insulator.

Because the cork oak tree regenerates the extracted cork bark, the harvesting practice is sustainable. Therefore the use of cork has little negative impact on the environment. Further the manufacturing process for cork flooring generates almost no waste. In fact, cork flooring uses the residuals from the production of cork stoppers. The residuals are finely ground and combined with binders such as, for example, polyurethane. Increasingly, pigments are added to create different colors or patterns. However, the known methods of applying colors or patterns are difficult to use and the appearance of cork floor and wall coverings are still limited.

BRIEF SUMMARY OF THE INVENTION

An object of the invention is to present a new method for applying a color pattern or design to a cork tile used for flooring, wall covering, or ceiling covering.

The term "tile" is used in the specification and claims to include any inlay, piece, sheet, board, or plank or other similarly shaped objects that can be used alone or together with other such inlays, pieces, sheets, boards, or planks to cover a floor, wall, or ceiling. Further, the tile may include click-lock flooring pieces that are connected to each other using interlocking elements, i.e., tongue and groove, or flooring pieces that lie next to each other such as glue-down tiles. The tile may comprise a laminate made of at least one layer of cork material or may be made entirely of cork material.

The object of the present invention is met by a process for applying a color pattern or design to a cork tile, including the steps of providing a release film, printing a design layer on the release film, applying a glue layer on the design layer so that the design layer is between the glue layer and the release film, and laminating the design layer and the glue layer onto a cork top surface of the cork tile using a heated laminating machine, so that the glue layer and the design layer are released from the release film and form the color pattern or design on the cork top surface.

The cork top surface is formed by agglomerating cork granules with a binder and curing at a temperature of 140-180° C. The cork granules of the cork top surface have a particle size of 0.5-1 mm and a density of 500-600 Kg/m³.

In one embodiment, the cork tile includes a backing layer arranged below the cork top surface. The backing layer is formed by agglomerating cork granules with a binder and curing at a temperature of 140° C. or less. The cork granules of the backing layer have a particle size of 1-2 mm and a density of 180-220 kg/m³.

A thickness of the combined design layer and glue layer, which forms the color pattern or design is 20-50 microns.

According to another embodiment, the release film is a PET film.

In a particular embodiment, the step of laminating is performed at a temperature of 100-190° C. and at a pressure of 400-600 bar.

In one embodiment, the heated laminating machine is a heated calendar and includes rolls having a circumference of 520-1500 mm. In an alternative embodiment, the heated laminating machine is a heated machine press.

The glue is an acrylic resin or a silicon dioxide and the design layer includes an ink comprising a polyamine ester with a pigment. The polyamine ester includes a vinyl chloride-acetate copolymer and an ester diluent.

In one embodiment, the step of printing is performed using an engraved cylinder. If multiple colors are printed, a plurality of engraved cylinders are used. As an alternative, inkjet printing and/or electrophotography may be used.

In one embodiment, a release agent is applied to the release film, wherein the step of printing includes printing the design layer on the release film.

According to an embodiment, the cork top surface is mounted on a base layer of the cork tile prior to the step of laminating. The base layer comprises a fiberboard plank or a wood plank.

To form a simulated wood grain or stone surface, the step of laminating optionally includes using an embossed roll or an embossed plate according to one embodiment of the present invention.

If a finishing coat or polymer layer is applied to the color pattern or design, the finishing coat or polymer layer may be embossed.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
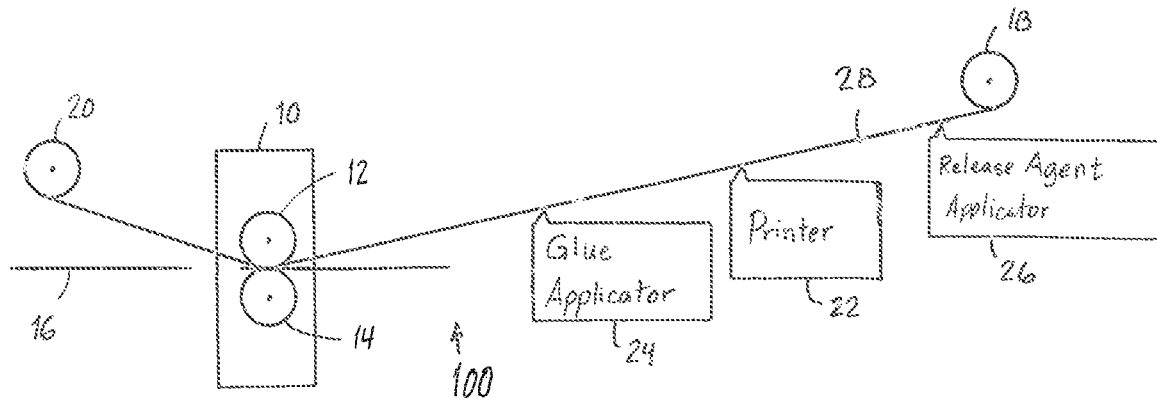
FIG. 1 is a schematic diagram of an apparatus for laminating a design onto a cork tile according to an embodiment of the present invention.

FIG. 1 shows an apparatus 100 for applying a color pattern or design to a cork tile such as a floor tile or wall tile. The apparatus 100 includes a calendar 10 with calendar rolls 12, 14, a release film supply reel 18, a release film take-up reel 20, a printer 22, a glue applicator 24, and a release agent applicator 26.

As a release film 28 is unwound from the supply reel 18, the release film 28 passes the release agent applicator 26, which applies a release agent to the release film. In one embodiment, the release film 28 is a Polyethylene terephthalate (PET) film. However, any known or hereafter developed release film may be used. The printer 22 is arranged downstream of the release agent applicator 26 and prints a design or pattern of a coloring agent such as ink or toner onto the release film after the release agent is applied. In a preferred embodiment, the printing is performed using ink applied by one or more engraved cylinders, i.e., one cylinder for each color of ink to be printed. Instead of using an engraved cylinder, printing may alternatively include other printing machines such as for example inkjet printing or electrophotography printing. The ink may include a polyamine ester, such as one made from a vinyl chloride-acetate copolymer and an ester diluent. The ink also will include a pigment (titanium dioxide for white-collar, and organic pigment for other colors). Instead of ink, other coloring agents such as, for example, toner can also be used. A glue applicator 24 downstream of the printer 22 applies a glue coating on the ink layer. In a preferred embodiment, the glue comprises an acrylic resin or silicon dioxide. However, other glues may alternatively by used.

The ink and the glue are dried on the release film and, after the glue and ink have dried, the release film with the glue and the ink is led through rolls 12, 14 of the calendar 10. The rolls 12, 14 apply pressure of 400-600 bar at a temperature of 100-190° C. so that the glue and the ink are released from the release film and laminated onto the cork tile 16. In one embodiment, the temperature and pressure cause the glue and the ink to mix together and form one composite layer on the cork tile. In another embodiment, the glue and ink remain as separate layers. In both cases, the pressure and temperature allow the glue to become tacky so that the glue adheres to the cork tile 16. After passing through the rolls 12, 14, the take-up reel 20 downstream of the calendar 10 collects the release film.

Figure 2:
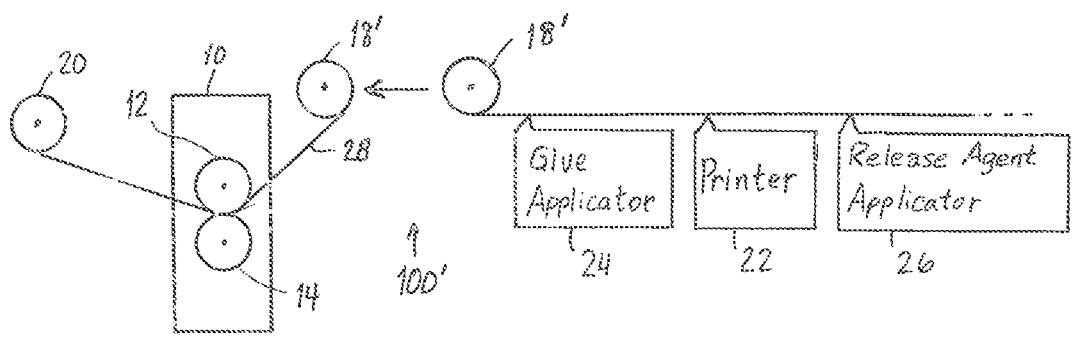
FIG. 2 is a schematic diagram of an apparatus for laminating a design onto a cork tile according to another embodiment of the present invention.

In the embodiment of FIG. 1, the release film is fed to the calendar 10 directly after the glue and ink is applied. FIG. 2 shows an alternative embodiment of an apparatus 100' according to the present invention, in which the release film is gathered on reel 18' after the glue and ink is applied so that the release film can be stored and subsequently connected to the apparatus 100' when required.

Figure 3:
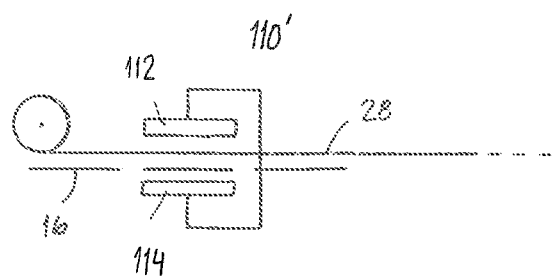
FIG. 3 is a schematic diagram of an apparatus for laminating a design onto a cork tile according to yet another embodiment of the present invention.

FIGS. 1 and 2 show embodiments using a calendar 10. As an alternative, FIG. 3 shows an embodiment in which a machine press 110 is used instead of the calendar 10. In the FIG. 3 embodiment, the cork tile and release film are pressed between two plates 112, 114 of the machine press 110 to laminate the glue and ink layers on to the cork tile 16. The plates 112, 114 apply a pressure of 400-600 bar at a temperature of 100-190° C.

Figure 4:
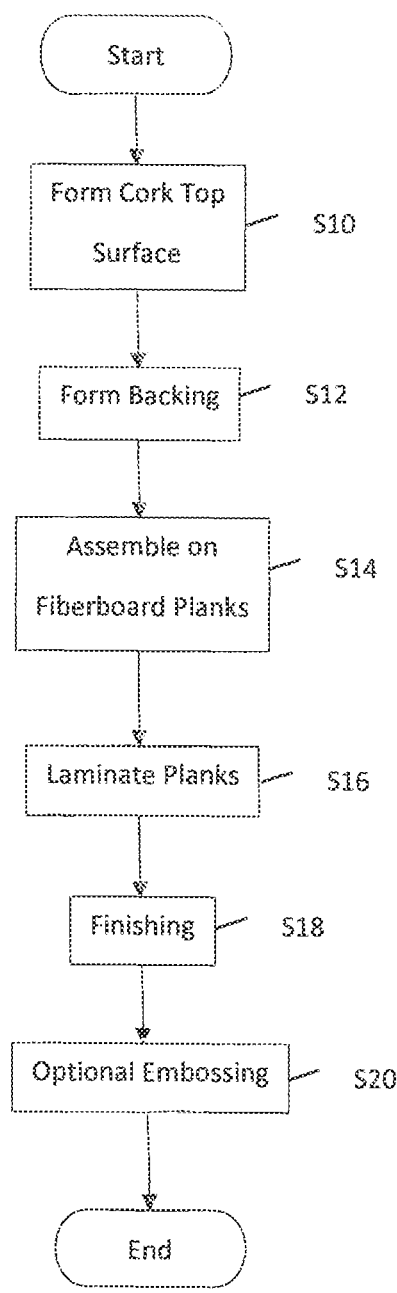
FIG. 4 is a flow diagram for a method of laminating a design onto a cork tile according to an embodiment of the present invention.

FIG. 4 is a flow diagram illustrating steps of the present invention for laminating a ink layer onto a cork tile. At step S10, a cork top surface of the cork tile is created by agglomeration of cork grains, i.e., resulting from post-industrial use, with cork granules having a particle size of 0.5-1 mm, and a density between 500-600 kg/m$^3$. The agglomeration is performed using water-based polyurethane binders and the cork top surface is cured at a temperature between 140-180° C. for 12 hours. The cork top surface of the cork tile has a thickness of 1-6 mm.

In step S12, a backing layer is formed by the same agglomeration process, but with cork grains having a particle size of 1-2 mm, and a density between 180-220 kg/m$^3$. The backing layer can be cured at a temperature of 140° C. or less. The backing layer is used as an underlayer at a bottom of the cork tile. The backing layer of the cork tile has a thickness of 1-4 mm.

Figure 6:
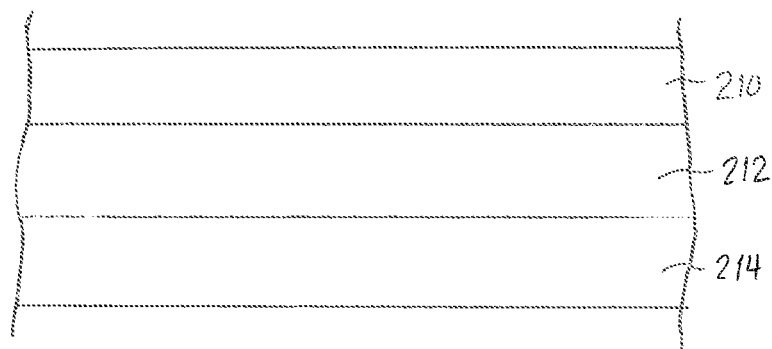
FIG. 6 is a cross-sectional view of a cork tile to be laminated with a design according to an embodiment of the present invention.

In step S14 the cork top surface and the backing are applied to a fiberboard plank using water-based adhesives with a specificity D3 or higher on heated plate presses to form the cork tile 16. Although fiberboard planks are used in the preferred embodiment, any known or hereafter developed base layer for flooring or wall covering may be used. As an example, wood or another cork layer may be used instead of the fiberboard planks. FIG. 6 shows a cross-section of the assembled cork tile with the cork top surface 210, the base layer 212, and the backing layer 214. Additional layers may be applied, for example, protective layers and adhesive layers. In one embodiment, the backing layer 212 and/or the base layer 212 may be omitted.

In step S16, and ink layer and glue layer are laminated onto the assembled cork tile, as described in more detail below. After the glue and ink layers are transferred to the cork tile, a finish layer such as urethane or polymers may is applied in step S18. For residential applications, the finish layer may include water-based or acrylic varnishes. For commercial applications, high wear resistance polymers, which are free of polyvinyl chloride (PVC), such as PET, polyurethane (PU), polyethylene (PE), and polystyrene (PS). These polymers may have different compositions to achieve specific performance characteristics.

The final product may be embossed, step S20. The embossing may be performed before or after the step of applying the finish. The embossing may be accomplished using embossing rolls, i.e., in the calendar 10 of the embodiments of FIGS. 1 and 2, or using embossing plates, i.e., in the machine press 110 of the embodiment of FIG. 3. If polymers are used during the step of finishing, the embossing must be done after the polymer is applied with a separate embossing device 30 (shown in dotted lines in FIG. 2). In a further embodiment, an already embossed polymer may be applied to the cork tile.

Figure 5:
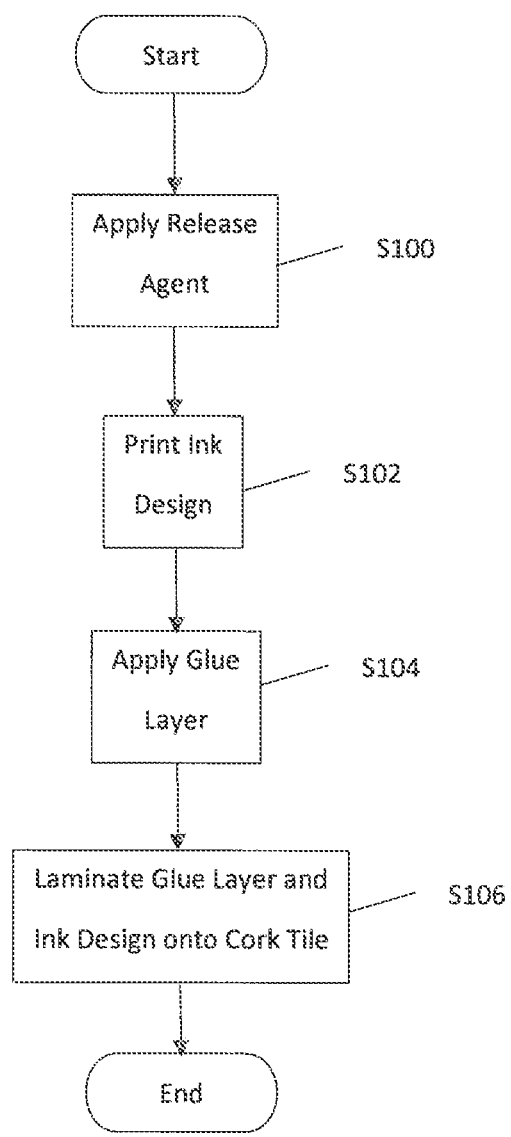
FIG. 5 is a more detailed flow diagram of a step of laminating.

FIG. 5 describes the lamination process. In step S100 a release agent is applied to the release film. Subsequently, a design ink is printed on to the release film, step S102. As stated above, the design layer is printed using an engraved cylinder with ink in a preferred embodiment. However, the design layer may also be printed using any known or hereafter developed printing method such as, for example, inkjet printing and electro-photography.

After the design layer is printed, a glue layer is applied on the ink layer, step S104. The glue comprises an acrylic resin or silicon dioxide. The glue layer and design layer are dried and then laminated onto the cork tile, step S106. The lamination can be accomplished using a calendar or a machine press as described above. In both cases, the lamination is accomplished with a pressure of 400-600 bar and at a temperature of 100-190° C.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A process for applying a color pattern or design to a cork tile, comprising the steps of:
   providing a release film;
   printing a design layer on the release film;
   applying a glue layer on the design layer so that the design layer is between the glue layer and the release film;
   laminating the design layer and the glue layer onto a cork top surface of the cork tile using a heated laminating machine, so that the glue layer and the design layer are released from the release film and form the color pattern or design on the cork top surface, wherein the step of laminating includes mixing the design layer and the glue layer to form one composite layer on the cork tile that forms the color pattern or design.

2. The process of claim 1, wherein a thickness of the composite layer is 20-50 microns.

3. The process of claim 1, wherein the release film is a PET film.

4. The process of claim 1, wherein the step of laminating is performed at a temperature of 100-190° C. and at a pressure of 400-600 bar.

5. The process of claim 4, wherein the heated laminating machine is a heated calendar.

6. The process of claim 5, wherein the calendar includes rolls having a circumference of 520-1500 mm.

7. The process of claim 4, wherein the heated laminating machine is a heated machine press.

8. The process of claim 1, wherein the glue layer includes an acrylic resin or a silicon dioxide and the design layer uses an ink having a polyamine ester with a pigment.

9. The process of claim 8, wherein the polyamine ester includes a vinyl chloride-acetate copolymer and an ester diluent.

10. The process of claim 1, wherein the step of printing is performed using an engraved cylinder.

11. The process of claim 1, further comprising the step of applying a release agent to the release film, wherein the step of printing includes printing the design layer on the release film.

12. The process of claim 1, wherein the cork top surface is mounted on a base layer of the cork tile prior to the step of laminating.

13. The process of claim 12, wherein the base layer is fiberboard plank or wood plank.

14. The process of claim 1, wherein the step of laminating includes using an embossed roll or an embossed plate.

15. The process of claim 1, further comprising the step of applying a finishing coat or polymer layer to the design layer.

16. The process of claim 15, further comprising embossing the finishing coat or polymer layer.

17. The process of claim 1, wherein the cork top surface has a thickness of 1-6 mm.

18. The process of claim 1, wherein the glue layer includes a silicon dioxide.

19. A process for applying a color pattern or design to a cork tile, comprising the steps of:
    providing a release film;
    printing a design layer on the release film;
    applying a glue layer on the design layer so that the design layer is between the glue layer and the release film;
    laminating the design layer and the glue layer onto a cork top surface of the cork tile using a heated laminating machine, so that the glue layer and the design layer are released from the release film and form the color pattern or design on the cork top surface, wherein the step of laminating includes mixing the design layer and the glue layer to form one composite layer on the cork tile that forms the color pattern or design; and
    forming the cork top surface by agglomerating cork granules with a binder and curing at a temperature of 140 to 180° C., the cork granules of the cork top surface having a particle size of 0.5-1 mm and a density of 500-600 Kg/m$^3$.

20. The process of claim 19, further comprising forming a backing layer of the cork tile arranged below the cork top surface by agglomerating cork granules with a binder and curing at a temperature of 140° C. or less, the cork granules of the backing layer having a particle size of 1-2 mm and a density of 180-220 kg/m$^3$.

21. The process of claim 20, wherein the cork top surface has a thickness of 1-6 mm and the backing layer has a thickness of 1-4 mm.

* * * * *